(12) United States Patent
Anderson et al.

(10) Patent No.: US 9,910,572 B2
(45) Date of Patent: Mar. 6, 2018

(54) DUPLICATION OF OBJECTS WITH POSITIONING BASED ON OBJECT DISTANCE

(71) Applicant: INTERNATIONAL BUSINESS MACHINES CORPORATION, Armonk, NY (US)

(72) Inventors: Taylor J. Anderson, Atlanta, GA (US); Thomas S. Brugler, Fuquay-Varina, NC (US); Richard Chen, Long Island City, NY (US); Randall A. Craig, Raleigh, NC (US); Kristin S. Moore, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 14/687,538

(22) Filed: Apr. 15, 2015

(65) Prior Publication Data

US 2016/0306526 A1 Oct. 20, 2016

(51) Int. Cl.
| | |
|---|---|
| *G06F 3/0484* | (2013.01) |
| *G06F 9/44* | (2006.01) |
| *G06F 3/0481* | (2013.01) |

(52) U.S. Cl.
CPC ........ *G06F 3/04842* (2013.01); *G06F 3/0481* (2013.01); *G06F 8/34* (2013.01); *G06F 8/38* (2013.01)

(58) Field of Classification Search
CPC .............. G06F 3/04842; G06F 3/0481; G06F 3/04845; G06F 8/34; G06F 8/38
See application file for complete search history.

(56) References Cited

U.S. PATENT DOCUMENTS

| | | |
|---|---|---|
| 8,842,084 B2 | 9/2014 | Andersson et al. |
| 2005/0172239 A1 | 8/2005 | Liu et al. |

(Continued)

FOREIGN PATENT DOCUMENTS

| | | |
|---|---|---|
| JP | 2009032028 A | 2/2009 |
| JP | 4333452 B2 | 9/2009 |
| JP | 2014010781 A | 1/2014 |

OTHER PUBLICATIONS

Morgan Robinson and Nathaniel Stein "Transforming Objects and Components in Maya 8" May 25, 2007 28 pages.*
"Qt Designer's Widget Editing Mode", http://docs.huihoo.com/qt/4.7/designer-widget-mode.html; as early as Apr. 2012.
"Copying Widgets", http://www.profitsuite.net/default.aspx?pageid=93; Dec. 2008.

(Continued)

*Primary Examiner* — Andrea Long
(74) *Attorney, Agent, or Firm* — Brown & Michaels, PC; John Pivnichny

(57) ABSTRACT

A method of graphically duplicating graphic objects through the steps of a computer: receiving a selection of at least two objects and a direction of duplication along an axis. A zero axis point, a farthest axis point for the objects based on the direction of duplication, and a proximal object is determined. A proximal offset point equivalent to a farthest point on the proximal object from the zero axis point is set. A distal object is determined from the objects based on the direction of duplication along the axis, with a starting point of the distal object being designated as a distal offset point. An offset distance equal to a distance between the distal offset point and the proximal offset point is determined. The selection of the objects is duplicated and placed immediately after the farthest axis point plus the offset distance from the farthest axis point.

15 Claims, 15 Drawing Sheets

(56) References Cited

U.S. PATENT DOCUMENTS

| | | |
|---|---|---|
| 2005/0234884 A1 | 10/2005 | Drukman et al. |
| 2008/0040681 A1 | 2/2008 | Synstelien et al. |
| 2009/0260022 A1 | 10/2009 | Louch et al. |
| 2010/0023874 A1 | 1/2010 | Frohwein |
| 2011/0141043 A1 | 6/2011 | Soubrie |
| 2011/0214078 A1 | 9/2011 | Klask et al. |
| 2012/0005611 A1 | 1/2012 | Wey et al. |
| 2012/0030567 A1 | 2/2012 | Victor |
| 2014/0245195 A1 | 8/2014 | Swanke |
| 2014/0245197 A1 | 8/2014 | Swanke |
| 2015/0026618 A1 | 1/2015 | Stone |

OTHER PUBLICATIONS

"Creating Widgets in PHAB", http://www.qnx.com/developers/docs/6.4.0/photon/prog_guide/widgets.html; as early as Feb. 2012.

Gould, A. "Duplicating and Positioning Shapes in PowerPoint", http://www.wiseowl.co.uk/blog/s132how_to_draw_jigsaw_puzzle_shapes_in_microsoft_powerpoint_pt2.htm; Jun. 2011.

Kerfoot, L. "Fast ways to copy and position objects", http://www.coreldraw.com/us/pages/items/1500712.html; Jan. 2006.

"Move Tool: Creating multiple copies (linear arrays)", http://help.sketchup.com/en/article/94867; as early as Jul. 2013.

"Illustrator Help/ Moving, aligning, and distributing objects", https://helpx.adobe.com/illustrator/using/moving-aligning-distributing-objects.html; as early as Jun. 2014.

Cohen, S. "Working with Objects in Adobe InDesign CC", http://www.peachpit.com/articles/article.aspx?p=2121389&seqNum=5; Aug. 2013.

\* cited by examiner

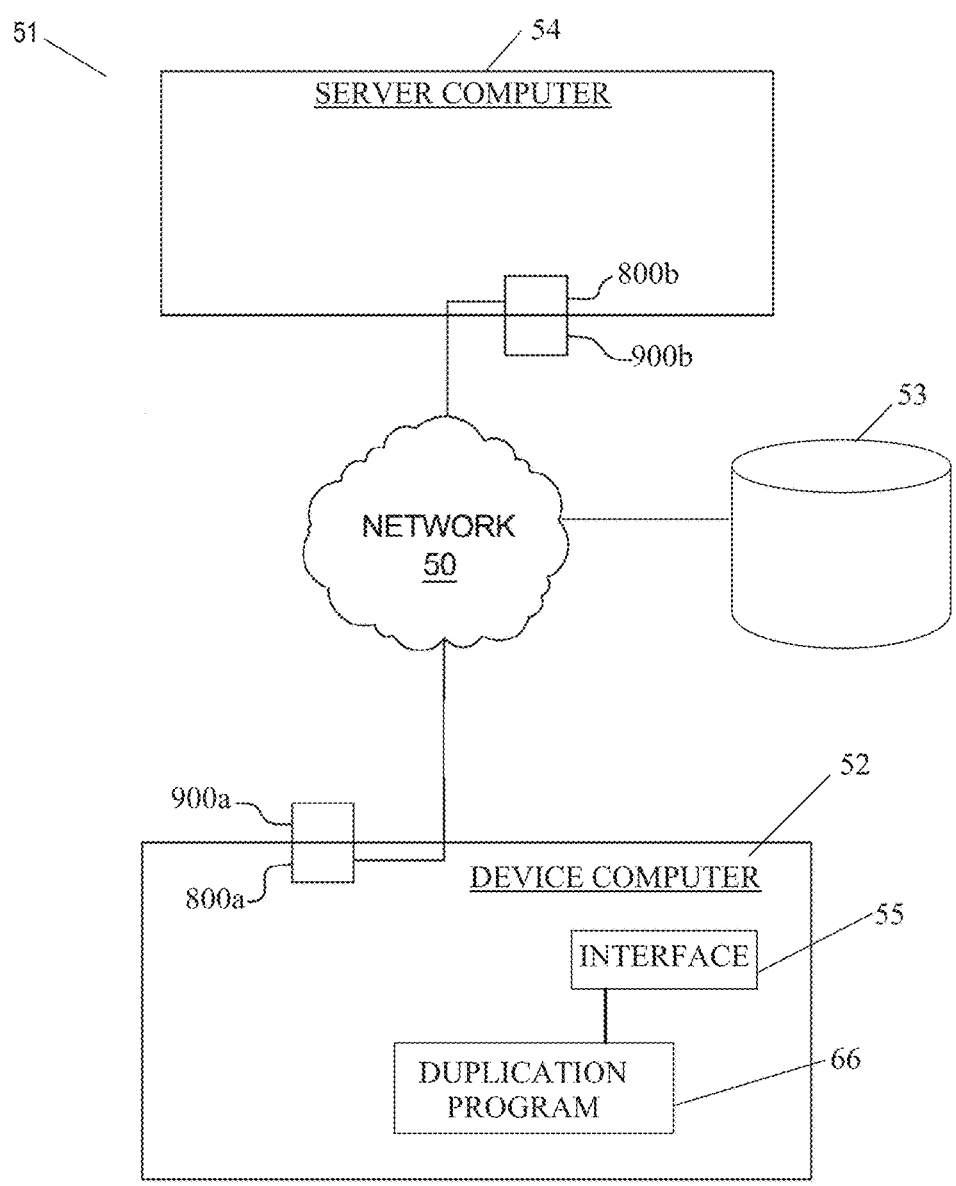

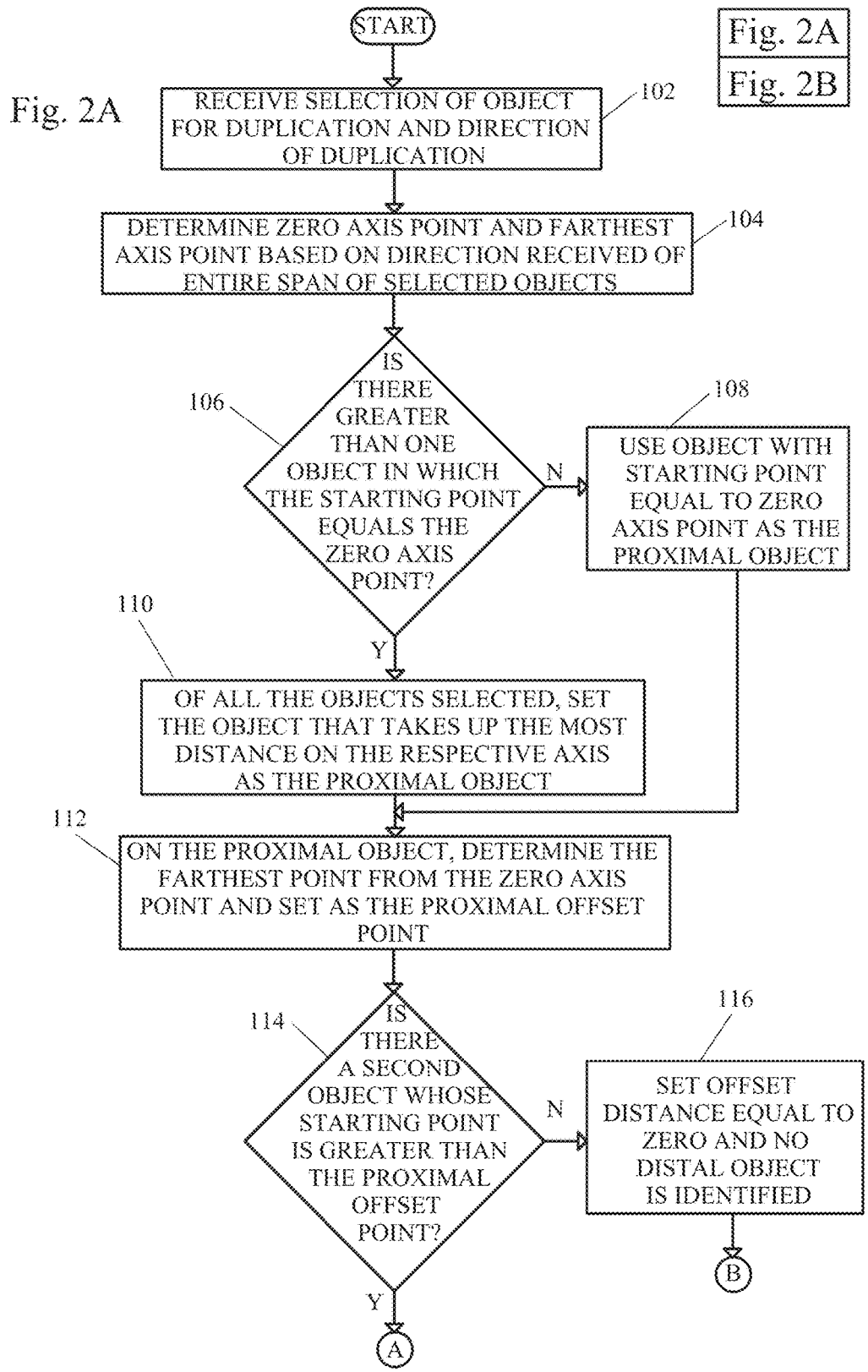

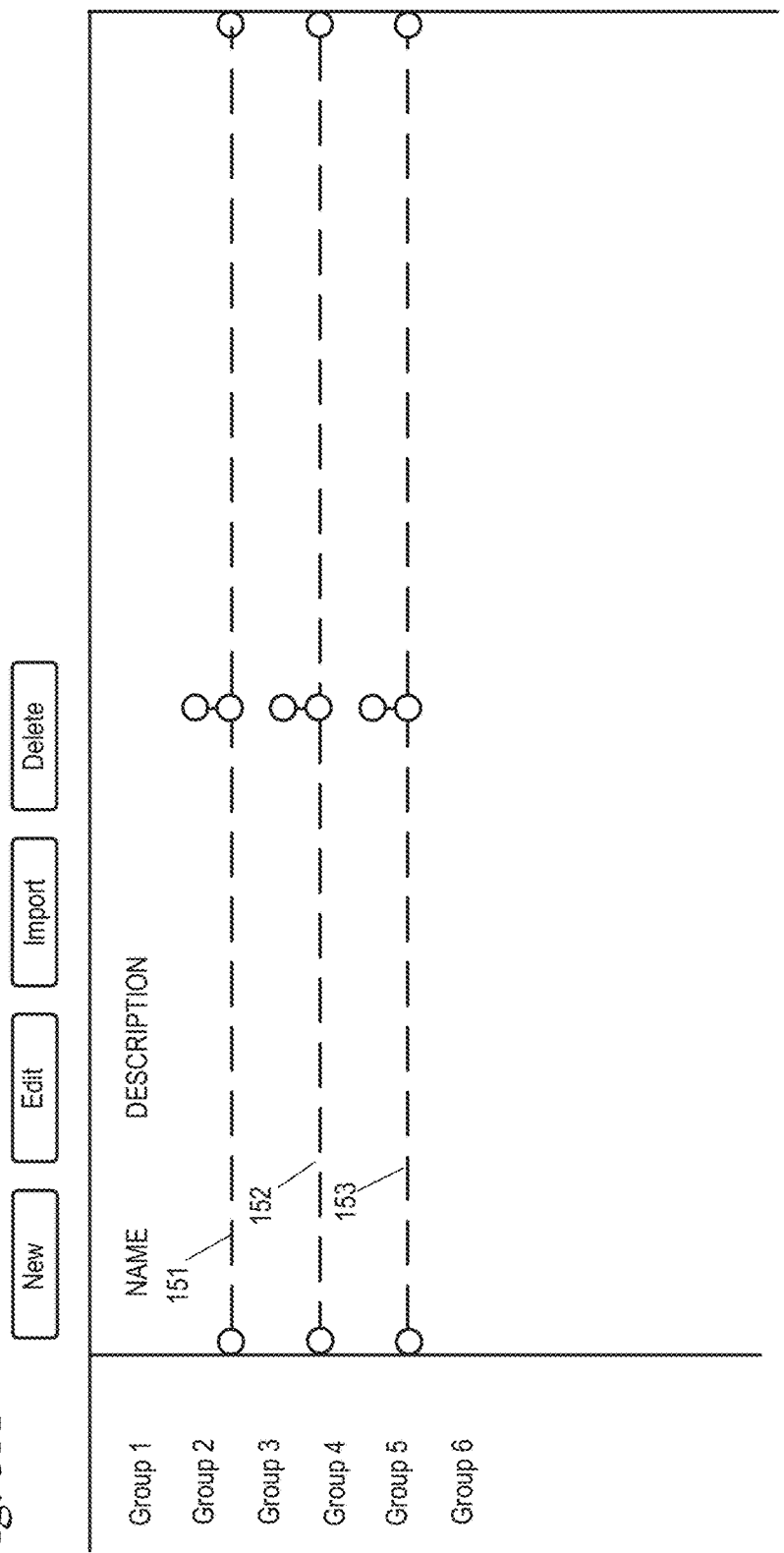

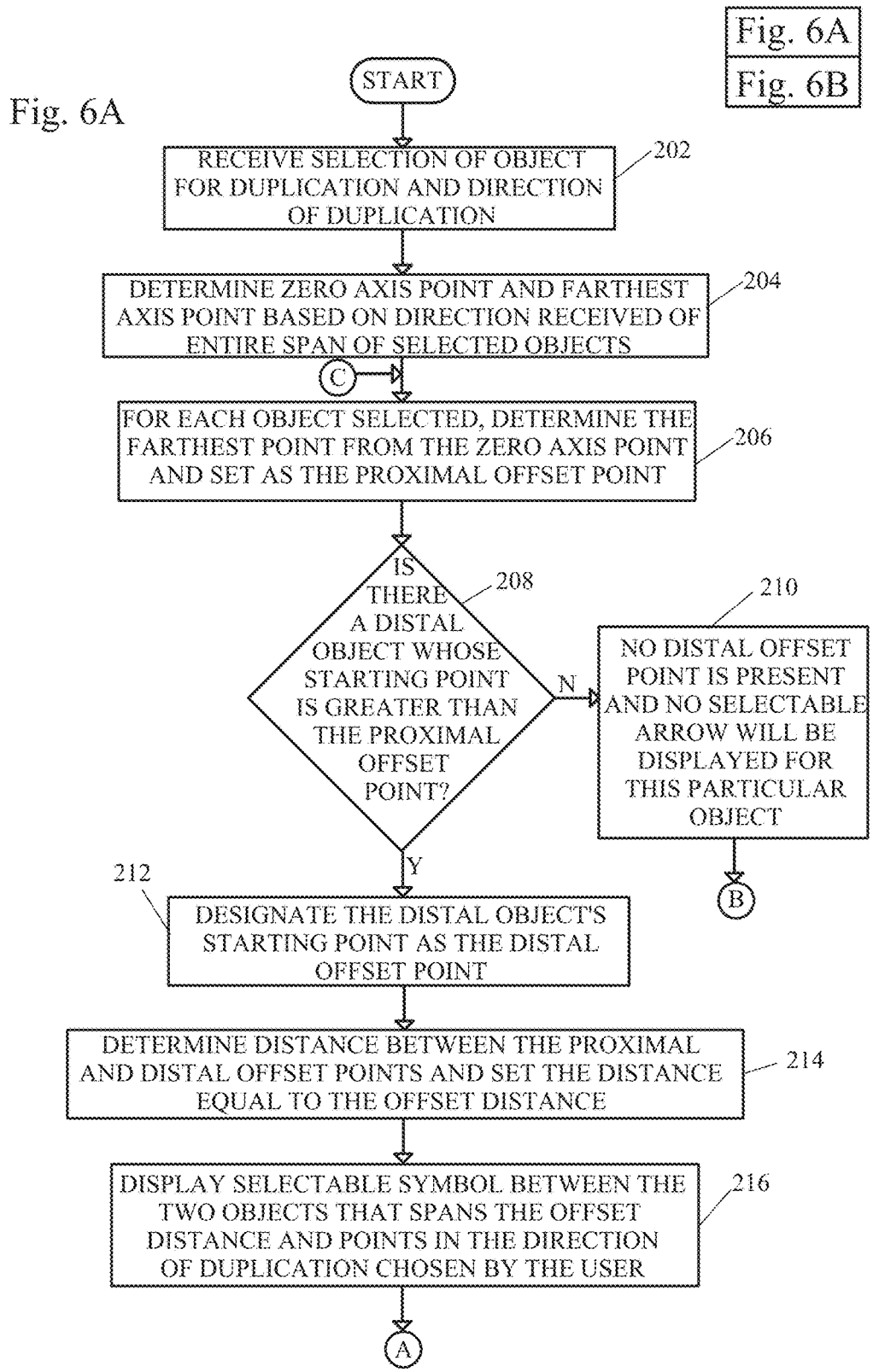

| MODEL # | MFG DATE |
|---|---|
| MQ 92873 | 02-21-14 |
| TL 2918 | 03-12-14 |

| MODEL # | MFG DATE |
|---|---|
| MQ 92873 | 02-21-14 |
| TL 2918 | 03-12-14 |

251 — MODEL #
252 — MQ 92873
253 — TL 2918
254, 255, 258
256, 257
230 — ORIGINAL OBJECTS

DUPLICATION OF OBJECTS WITH POSITIONING BASED ON OBJECT DISTANCE

BACKGROUND

The present invention relates to duplication of graphic objects, and more specifically to duplication of objects in a graphics application with positioning based on object distance.

In most graphic drawing applications, 'Duplicate' is a standard function that is used to copy a series of objects. It should be noted that the 'duplicate' function is different than the 'copy' function and does not interfere with any objects or information placed on a clipboard.

A user selects objects to be duplicated, inputs a command for duplication, and the program places the duplicated objects—usually downward and to the right of the original objects that were duplicated. After the duplication, a user needs to reposition the objects, often through manual dragging of the objects. Repositioning of the duplicated objects can be time consuming if true precision is required between the objects and the location of the duplicated objects needs to follow consistent patterns of relative spacing. To ensure that the alignment and spacing of the duplicated objects is the same as the other objects, the user may need to employ grids, guidelines, an 'align' command, or some other means in order to reposition the duplicated object to the correct position relative to the original objects.

SUMMARY

According to one embodiment of the present invention, a method of graphically duplicating graphic objects is disclosed. The method comprising the steps of: a computer receiving a selection of at least two objects and a direction of duplication along an axis, each of the at least two objects having a starting point and a farthest point relative to the direction of the duplication along the axis; the computer determining a zero axis point and a farthest axis point based on the direction of duplication of the at least two objects; the computer determining a proximal object from the at least two objects and setting a proximal offset point equivalent to a farthest point on the proximal object from the zero axis point; the computer determining a distal object from the at least two objects based on the direction of duplication along the axis, and that the distal object has a starting point that is further along the axis associated with the direction of duplication than the proximal offset point; the computer designating a starting point of the distal object as a distal offset point; the computer determining an offset distance equal to a distance between the distal offset point and the proximal offset point; and the computer duplicating the selection of the at least two objects and placing duplicates of the selection of the at least two objects immediately after the farthest axis point, plus the offset distance of the original objects.

According to another embodiment of the present invention, a computer program product for graphically duplicating graphic objects with a computer comprising at least one processor, one or more memories, one or more computer readable storage media. The computer program product comprising a computer readable storage medium having program instructions embodied therewith. The program instructions executable by the computer to perform a method comprising: receiving, by the computer, a selection of at least two objects and a direction of duplication along an axis, each of the at least two objects having a starting point and a farthest point relative to the direction of the duplication along the axis; determining, by the computer, a zero axis point and a farthest axis point based on the direction of duplication of the at least two objects; determining, by the computer, a proximal object from the at least two objects and setting a proximal offset point equivalent to a farthest point on the proximal object from the zero axis point; determining, by the computer, a distal object from the at least two objects based on the direction of duplication along the axis, and that the distal object has a starting point that is further along the axis associated with the direction of duplication than the proximal offset point; designating, by the computer, a starting point of the distal object as a distal offset point; determining, by the computer an offset distance equal to a distance between the distal offset point and the proximal offset point; and duplicating, by the computer, the selection of the at least two objects and placing duplicates of the selection of the at least two objects immediately after the farthest axis point, plus the offset distance of the original objects.

According to another embodiment of the present invention, a computer system for graphically duplicating graphic objects. The computer system comprising a computer comprising at least one processor, one or more memories, one or more computer readable storage media having program instructions executable by the computer to perform the program instructions comprising: receiving, by the computer, a selection of at least two objects and a direction of duplication along an axis, each of the at least two objects having a starting point and a farthest point relative to the direction of the duplication along the axis; determining, by the computer, a zero axis point and a farthest axis point based on the direction of duplication of the at least two objects; determining, by the computer, a proximal object from the at least two objects and setting a proximal offset point equivalent to a farthest point on the proximal object from the zero axis point; determining, by the computer, a distal object from the at least two objects based on the direction of duplication along the axis, and that the distal object has a starting point that is further along the axis associated with the direction of duplication than the proximal offset point; designating, by the computer, a starting point of the distal object as a distal offset point; determining, by the computer an offset distance equal to a distance between the distal offset point and the proximal offset point; and duplicating, by the computer, the selection of the at least two objects and placing duplicates of the selection of the at least two objects immediately after the farthest axis point plus the offset distance of the original objects.

BRIEF DESCRIPTION OF THE SEVERAL VIEWS OF THE DRAWINGS

FIG. 1 depicts an exemplary diagram of a possible data processing environment in which illustrative embodiments may be implemented.

FIGS. 2A-2B show a flow diagram of a method of duplicating objects.

FIGS. 5A-5B shows an example of duplication downward using the y-axis distance between two objects as the offset distance using the method of FIGS. 2A-2B.

FIG. 6A-6B show a flow diagram of an alternate method of duplication objects.

DETAILED DESCRIPTION

Figure 2B:
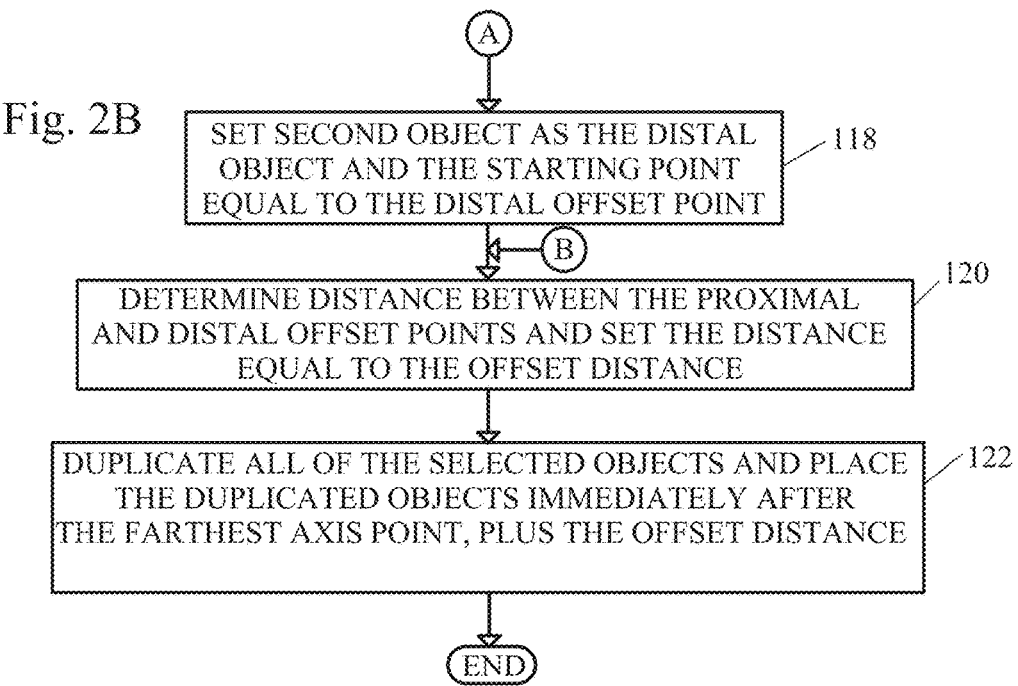

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Figure 11:
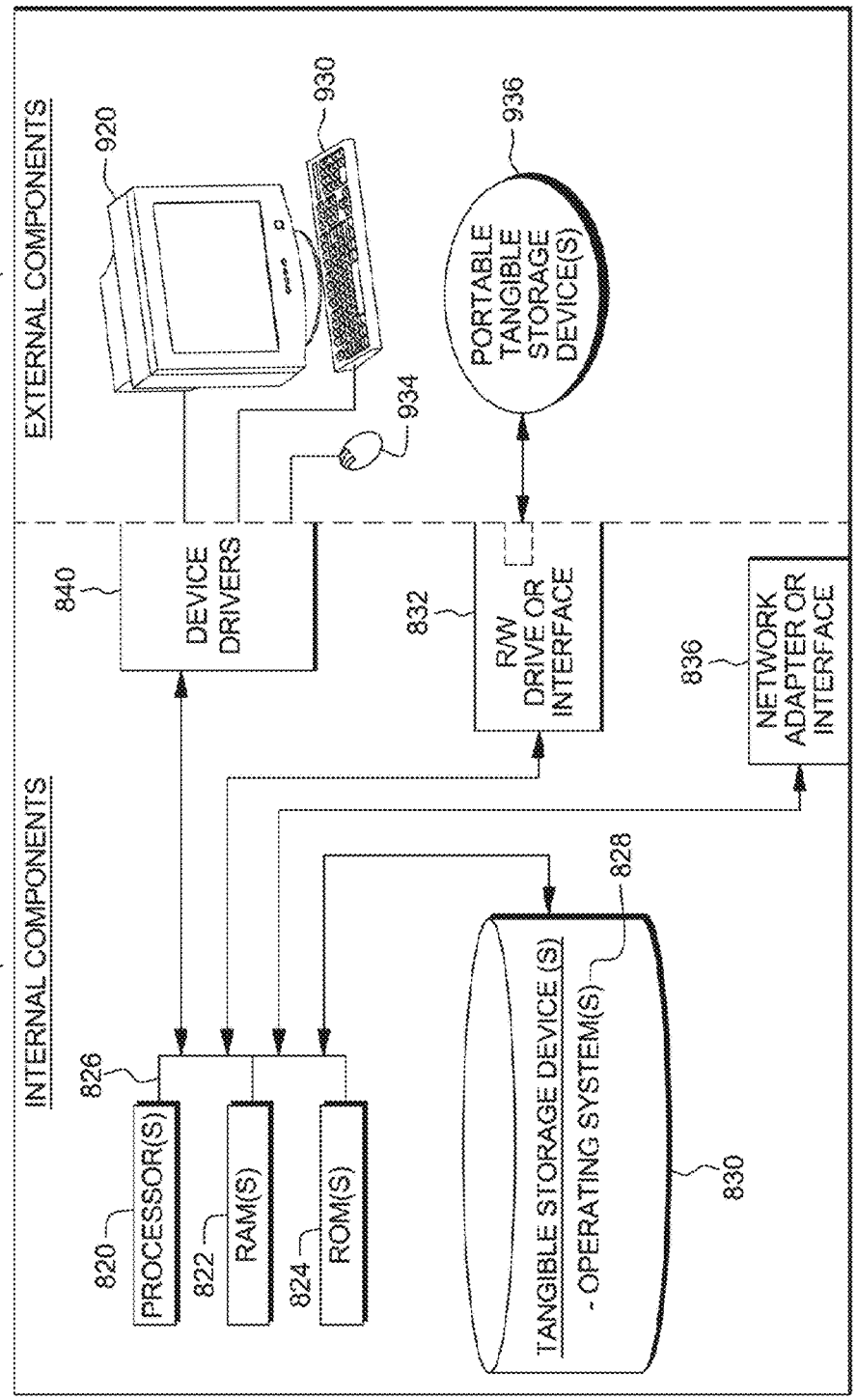
FIG. 11 illustrates internal and external components of a client or device computer and a server computer in which illustrative embodiments may be implemented.

Device computer 52 includes a set of internal components 800a and a set of external components 900a, further illustrated in FIG. 11. Device computer 52 may be, for example, a mobile device, a cell phone, a personal digital assistant, a netbook, a laptop computer, a tablet computer, a desktop computer, or any other type of computing device.

Device computer 52 may contain an interface 55. The interface 55 may accept commands and data entry from a user. The interface 55 can be, for example, a command line interface, a graphical user interface (GUI), or a web user interface (WUI). The device computer 52 preferably includes a duplication program 66. While not shown, it may be desirable to have the duplication program 66 on the server computer 54.

Server computer 54 includes a set of internal components 800b and a set of external components 900b illustrated in FIG. 11. In the depicted example, server computer 54 provides information, such as boot files, operating system images, and applications to device computer 52. Server computer 54 can compute the information locally or extract the information from other computers on network 50.

Program code and programs such as a duplication program 66 may be stored on at least one of one or more computer-readable tangible storage devices 830 shown in FIG. 11, on at least one of one or more portable computer-readable tangible storage devices 936 as shown in FIG. 11, on repository 53 connected to network 50, or downloaded to a data processing system or other device for use. For example, program code and programs such as duplication program 66 may be stored on at least one of one or more tangible storage devices 830 on server computer 54 and downloaded to the device computer 52. Alternatively, server computer 54 can be a web server, and the program code and programs such as a duplication program 66 may be stored on at least one of the one or more tangible storage devices 830 on server computer 54 and accessed on the device computer 52. Duplication program 66 can be accessed on device computer 52 through interface 55. In other exemplary embodiments, the program code and programs such as a duplication program 66 may be stored on at least one of one or more computer-readable tangible storage devices 830 on server computer 54 or distributed between two or more servers.

Figure 3:
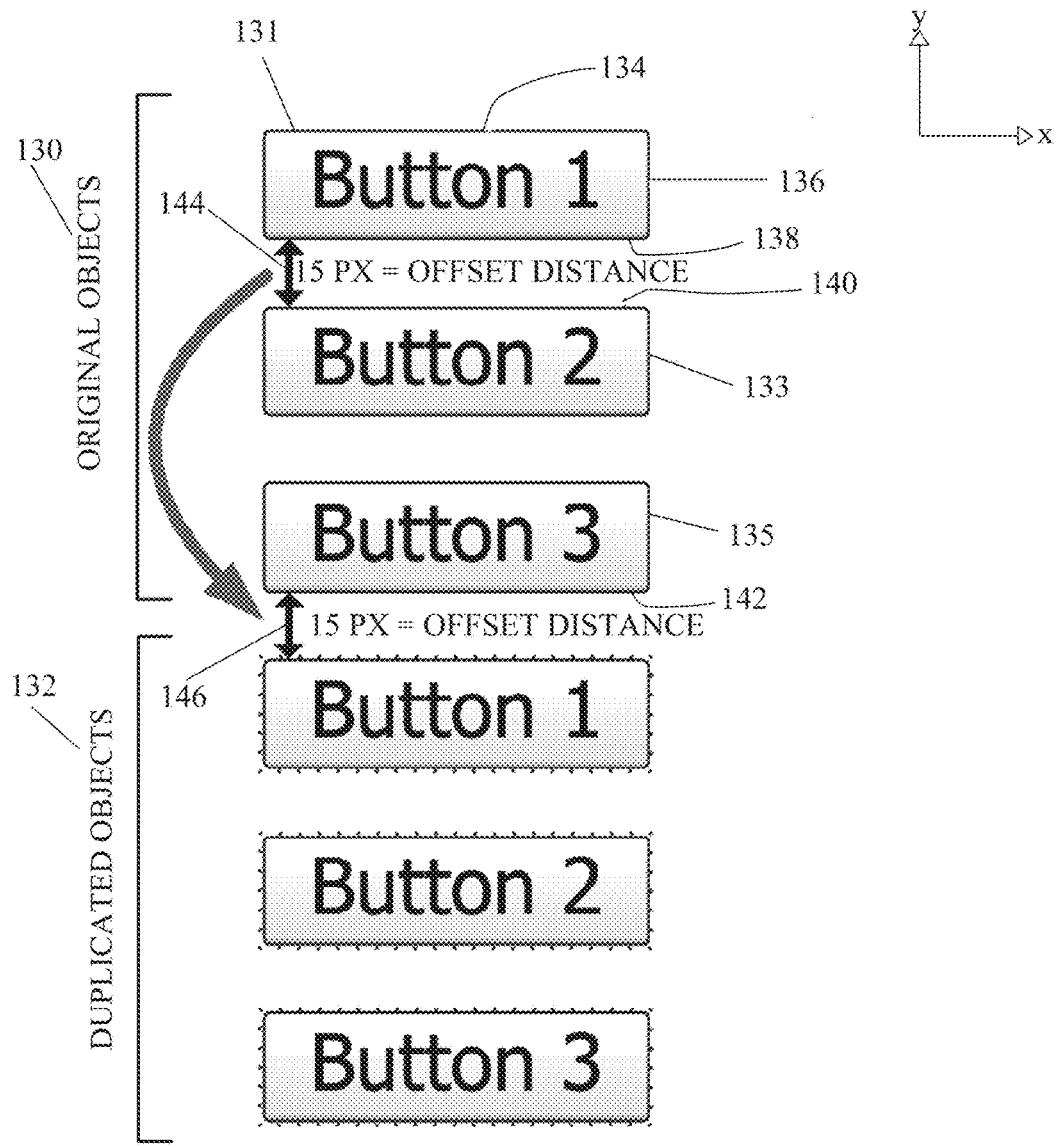
FIG. 3 is an illustration of the method of FIGS. 2A-2B.

FIGS. 2A-2B show a flow diagram of a method of duplicating objects. FIG. 3 illustrates the method.

It should be recognized that in an embodiment of the present invention that multiple objects are duplicated at one time. The spacing of selected objects is used as input for an offset distance that is used in the positioning of the duplicated objects.

It should be recognized that in an embodiment of the present invention, an offset distance for duplication does not have to be carefully measured by the user and saved by the user in a settings dialog. A duplication that may have occurred previously is not relied upon for automated repositioning of the objects. Furthermore, the offset distance may change with each duplication and need not involve superfluous user actions in moving from one duplication to another.

In a first step, a selection of objects for duplicating and a direction for the duplication is received (step 102). It should be noted that at least two objects are selected for duplication. This selection may be done using any number of means. A mouse, stylus, or user's touch may be used to select the objects to be duplicated. An indication of the direction for the duplication is also provided by the user. The indication of the direction for the duplication is preferably indicated by the depressing of an arrow key, although other means of indicating direction may also be used. Alternatively, an additional key in addition to an arrow key may be used to select and indicate the items for and the direction of duplication, for example the 'ctrl' key. In FIG. 3, the original objects 130 were selected by a user along with a direction of duplication, which in this case is down.

A zero axis point 134 and the farthest axis point 142, based on the direction of duplication received of an entire span of the selected objects 130, is determined (step 104), for example by the duplication program 66.

The farthest axis point 142 is the furthest point from the first object 131 of the objects selected for duplication, indicated in FIG. 3 as "Button 1", to be duplicated relative to the direction or axis chosen for duplication. The zero axis point 134 is the point on the first object selected for duplication that is the starting point relative to the direction which was selected for duplication.

Referring to Table 1 below, for example, as in FIG. 3, with the down arrow key selected by the user, the zero axis point would be the topmost point of the highest object(s) on the y-axis, which is "Button 1" 131.

The other zero axis points are defined in Table 1, depending on which arrow key was indicated or chosen by the user.

TABLE 1

| Zero Axis Point | Down Arrow Key | Topmost point of the highest object(s) on the y-axis |
| --- | --- | --- |
| | Up Arrow Key | Lowest point on the lowest object(s) on the y-axis |
| | Left Arrow Key | Rightmost point on the rightmost object(s) on the x-axis |
| | Right Arrow Key | Leftmost point on the leftmost object(s) on the x-axis |
| Farthest Axis Point | Down Arrow Key | Lowest point on the lowest object(s) on the y-axis |
| | Up Arrow Key | Topmost point on the highest object(s) on the y-axis |
| | Left Arrow Key | Leftmost point on the leftmost object(s) on the x-axis |
| | Right Arrow Key | Rightmost point on the rightmost object(s) on the x-axis |

If there is not more than one object to be duplicated that has a starting point which equals the zero axis point (step 106), then the only object with the starting point equal to the zero axis point is determined to be the proximal object (step 108), for example by the duplication program 66, and the method continues to step 112.

Referring to FIG. 3, "Button 1" 131 is the proximal object 136 of the original objects 130 selected for duplication. "Button 1" 131 has a starting point which equals the zero axis point.

If there is more than one object to be duplicated that has a starting point which equals the zero axis point (step 106), of all of the objects selected for duplication, the object that takes up or covers the most distance on the respective axis is set as the proximal object (step 110). Greater than the proximal offset point, refers to the starting point that is further along the axis associated with the direction of duplication than the proximal offset point.

On the proximal object, the farthest point from the zero axis point is determined and set as the proximal offset point (step 112), for example by the duplication program 66. Referring to FIG. 3, the proximal offset point is indicated by reference number 138.

If a second object whose starting point is greater than the proximal offset point is not present (step 114), the offset distance is set to be equal to zero and the no distal object is identified (step 116) and the method continues to step 120. "Greater than the proximal offset point" refers to the starting point that is further along the axis associated with the direction of duplication than the proximal offset point. An example of when steps 114 and 116 may be carried out is if the objects to be duplicated overlapped each other. In that case, an offset distance that would useful in placing duplicate objects would not be present and instead, the objects would be duplicated in the directed direction and placed directly after the objects to be duplicated.

If there is a second object whose starting point is greater than the proximal offset point (step 114), the second object is set as the distal object and the starting point of the distal object is set to be equal to the distal offset point (step 118), for example by the duplication program 66. In FIG. 3, the distal object would be "Button 2" 133 and the distal offset point is indicated by reference number 140.

Next, the distance between the proximal offset point and the distal offset points is determined and the determined distance difference is set as the offset distance (step 120). As shown in FIG. 3, the offset distance 144 is 15 pixels. The offset distance 144 is the original offset distance associated with the original objects for duplication.

All of the selected objects are then duplicated and placed immediately after the farthest axis point, plus the offset distance (step 122), for example by the duplication program 66 and the method ends.

The farthest axis point is the point furthest away from the zero axis point on the last object to be duplicated in the direction of the duplication chosen. FIG. 3 shows "Button 3" 135 as the last object selected for duplication. The duplicated objects 132 are an offset distance of 15 pixels from the farthest axis point 142. The offset distance 146 of the duplicated objects 132 is the same as the offset distance 144 of the original objects 130.

Figure 4A:
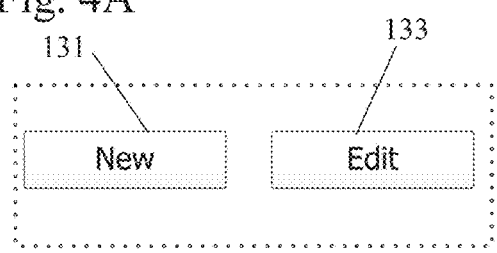
FIGS. 4A-4C show an example of duplication rightward using the x-axis distance between two objects as the offset distance using the method of FIGS. 2A-2B.
Figure 4B:
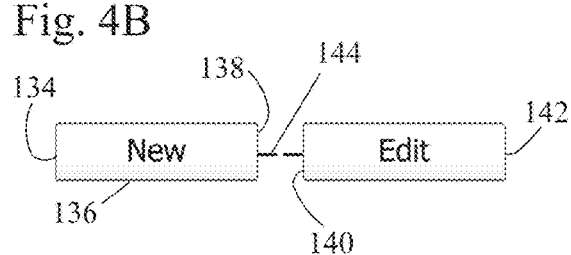
Figure 4C:
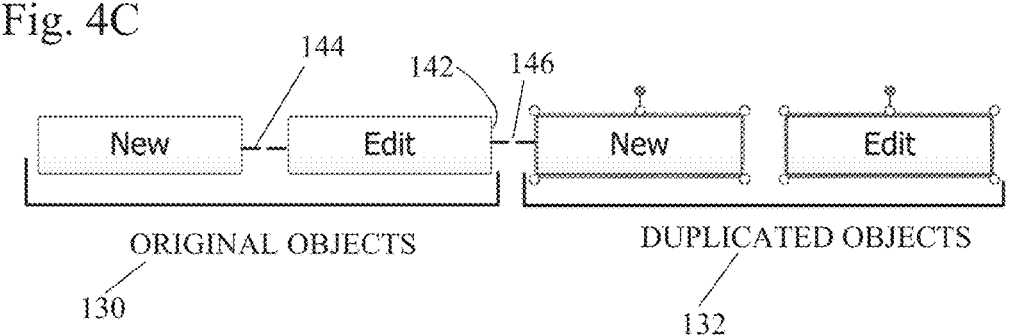

FIGS. 4A-4C show an example of the method of FIGS. 2A-2B, with two objects selected for duplication and the direction of the duplication being to the right. The user indicates a selection, shown by the dotted line, with the selection including "New" and "Edit" buttons 131, 133 and a direction of duplication, which is to the right. The duplication and direction commands received by the duplication program 66 may be a combination of the control key and the right arrow key.

The zero axis point 134 and the farthest axis point 142 are determined. As shown in the figures, the starting point 134 of the "New" button 131 is the leftmost side and the farthest axis point 138 of the "New" button 131 is the rightmost side. The starting point 140 of the "Edit" button 133 is the leftmost side and the farthest axis point 142 of the "Edit" button 133 is the rightmost side.

In this case, the zero axis point 134 is the leftmost side of the "New" button 131. The farthest axis point 142 of all of the objects selected for duplication is the rightmost side of the "Edit" button 133.

Since there is not more than one object for duplication that has a starting point equal to the zero axis point, the object with the zero axis point is the proximal object, thus the "New" button 131 is the proximal object 136. On the "New" button 131 from the zero axis point 134, point 138 is the proximal offset point 138 and is on the rightmost side of the "New" button 131.

Since a second object, the "Edit" button 133, has a starting point 140 that is greater than the proximal offset point 138, the starting point 140 is set equal to the distal offset point. The distance between the proximal offset point 138 and the distal offset point 140 is determined and is the offset distance 144.

The "New" button and the "Edit" button are duplicated and placed immediately after the farthest axis point 142, plus the offset distance 146 (which is equal to the offset distance 144) of the original objects selected for duplication. The user may continue to press a command key and a direction key to duplicate the object selected as many times as the user wishes.

It should be noted that while the examples given in FIGS. 3 and 4A-4C were for buttons, any object may be duplicated, lines, links, wording, etc. . . . .

Figure 5B:
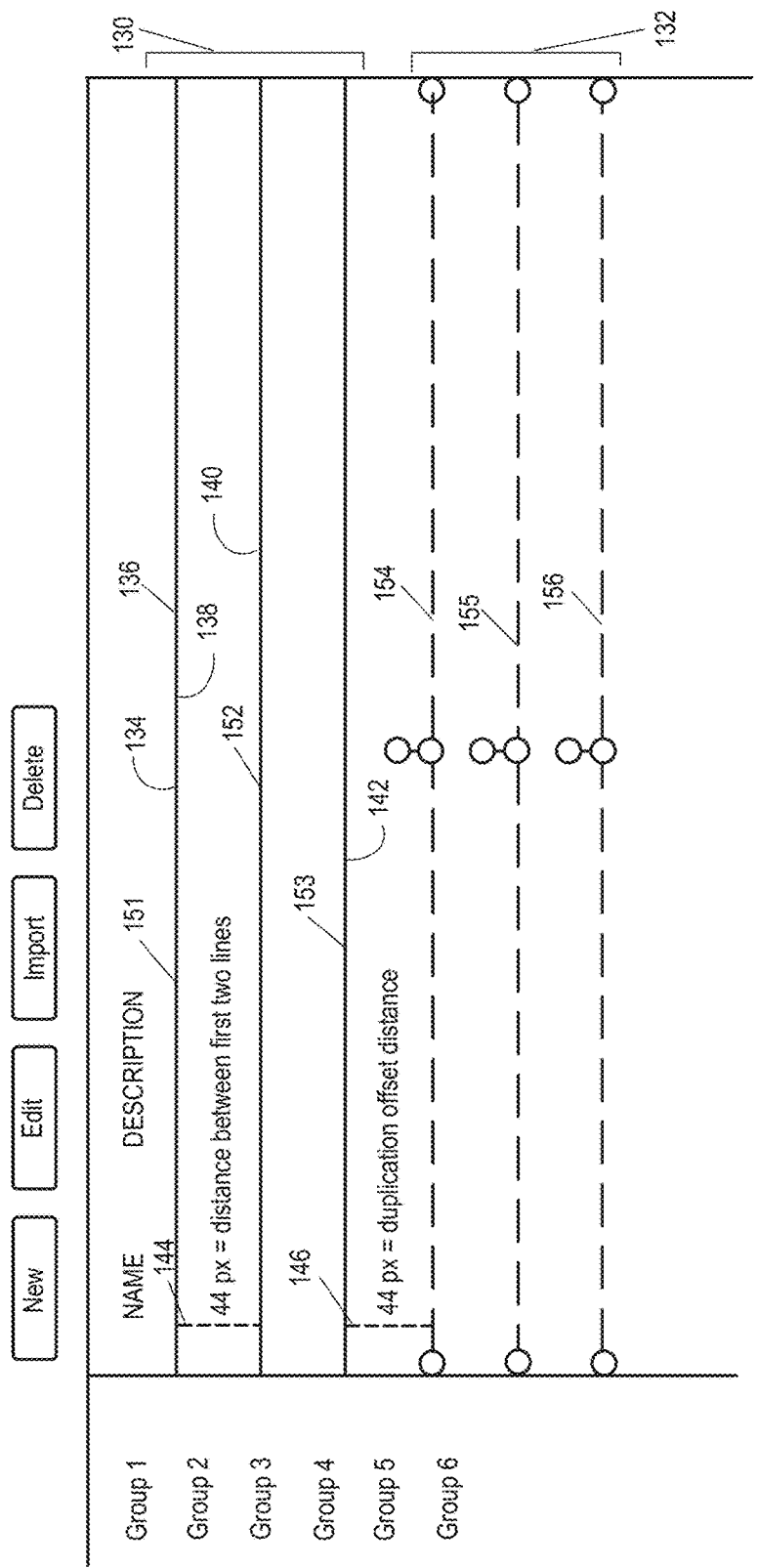

FIGS. 5A-5B show another example of the implementation of the method of FIGS. 2A-2B. In FIG. 5A, three lines, 151, 152, 153 are selected by the user along with a direction for duplication, which in this case is down.

The zero axis point 134 and the farthest axis point 142 are determined. As shown in the figures, the starting point of the first line 151 is the top of the first line and the farthest axis point 138. The farthest axis point is only determined by the first two objects selected, in this case, line 151 and line 152. The "first" and "second" are determined by the direction of duplication, the first object that would be selected in that direction and the second object selected in that direction.

The spacing between any additional objects, for example between the second line and third line 152, 153 in this example is not considered and has no bearing on the positioning of the duplicated objects.

In this case, the zero axis point 134 is top of the first line 151 and the farthest axis point 138 is the bottom of the first line 151. The farthest axis point 142 of all of the objects selected for duplication is the bottom of the third line 153.

Since there is not more than one object for duplication that has a starting point equal to the zero axis point, the object with the zero axis point is the proximal object, thus the first line 151 is the proximal object 136. The farthest point of the first line 151 from the zero axis point 134 is the proximal offset point 138 and it is the bottom of the first line 151.

Since a second object, the second line 152, has a starting point 140 that is greater than the proximal offset point 138, the starting point 140 is set equal to the distal offset point. The distance between the proximal offset point 138 and the distal offset point 140 is determined and is the offset distance 144, which may be 44 pixels.

The first, second and third lines 151, 152, 153 are duplicated and placed immediately after the farthest axis point 142, plus the offset distance 146 (which is equal to the offset distance 144) of the original objects selected for duplication. The user may continue to press a command key and a direction key to duplicate the object selected as many times as the user wishes.

Figure 6B:
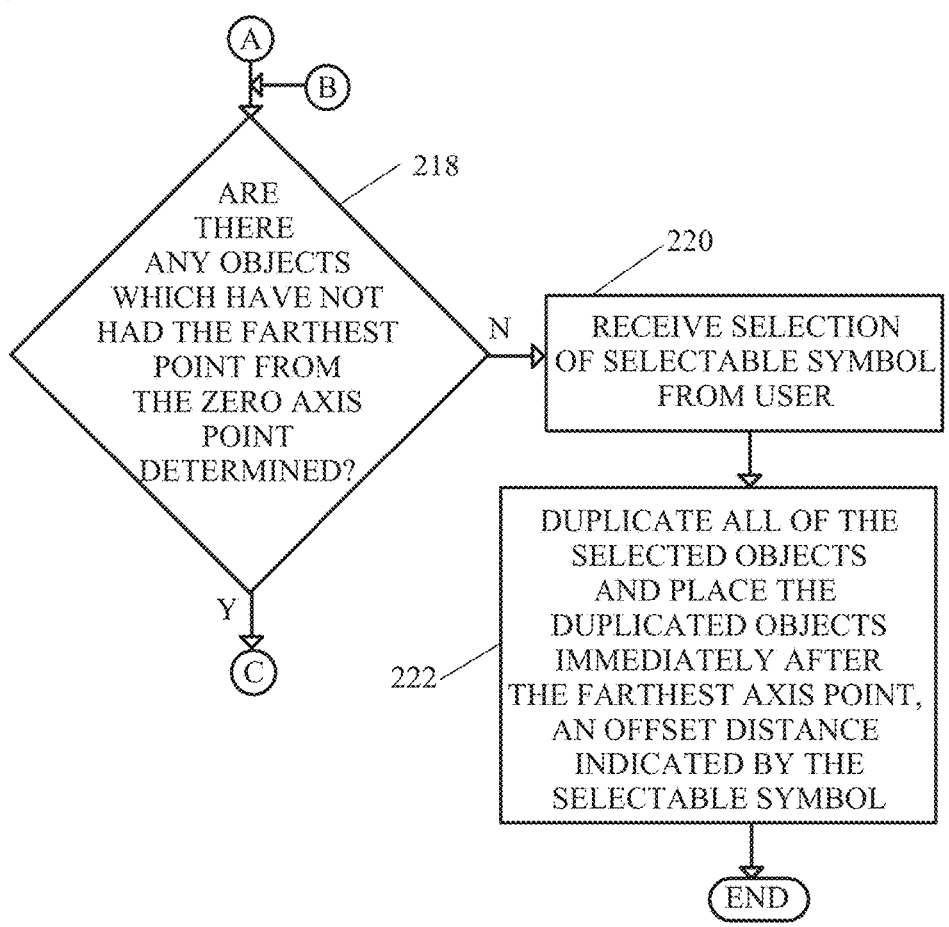
Figure 7:
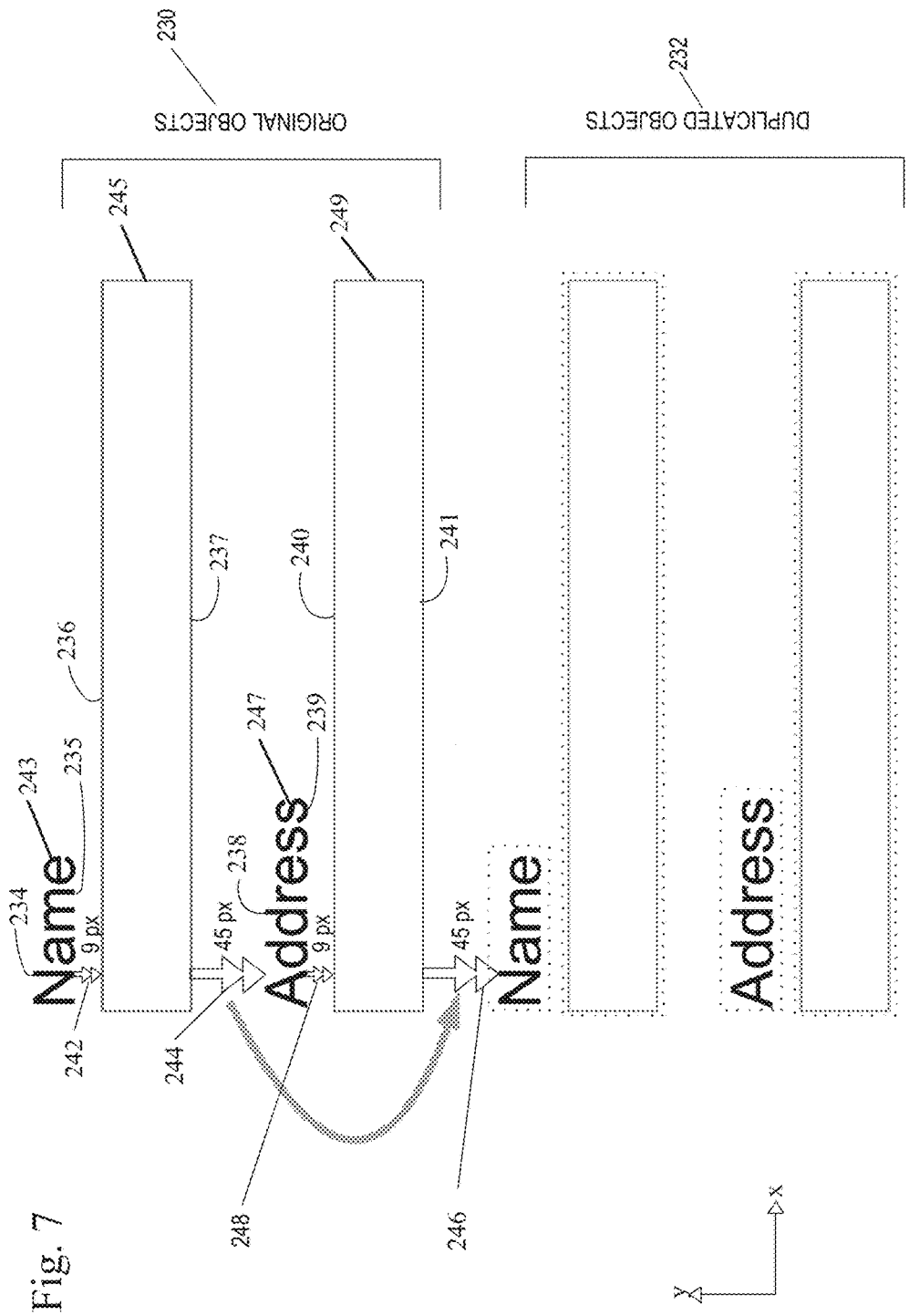
FIG. 7 illustrates concepts of the method of FIGS. 6A-6B.

FIGS. 6A-6B show a flow diagram of an alternate method of duplication objects. FIG. 7 illustrates concepts of the method.

In a first step, a selection of objects for duplicating and a direction for the duplication is received (step 202). It should be noted that at least two objects are selected for duplication. This selection may be done using any number of means. A mouse, stylus, or user's touch may be used to select the objects to be duplicated. An indication of the direction for the duplication is also provided by the user. The indication of the direction for the duplication is preferably indicated by the depressing of an arrow key, although other means of indicating direction may also be used. Alternatively, any additional key in addition to an arrow key may be used to select and indicate the items for and the direction of duplication, for example the shift key. In FIG. 7, the original objects 230 were selected by a user along with a direction of duplication, which in this case is down.

A zero axis point 234 and the farthest axis point 242 based on the direction of duplication received of an entire span of the selected objects 230 is determined (step 204), for example by the duplication program 66.

Referring to Table 2 below, for example, as in FIG. 7, with the down arrow key selected by the user, the zero axis point would be the topmost point of the highest object(s) on the y-axis, which is the top of the label "Name" 234.

The other zero axis points are defined in Table 2, depending on which arrow key was indicated or chosen by the user.

TABLE 2

| Zero Axis Point | Down Arrow Key | Topmost point of the highest object(s) on the y-axis |
| --- | --- | --- |
| | Up Arrow Key | Lowest point on the lowest object(s) on the y-axis |
| | Left Arrow Key | Rightmost point on the rightmost object(s) on the x-axis |
| | Right Arrow Key | Leftmost point on the leftmost object(s) on the x-axis |

TABLE 2-continued

| Farthest Axis Point | Down Arrow Key | Lowest point on the lowest object(s) on the y-axis |
| --- | --- | --- |
| | Up Arrow Key | Topmost point on the highest object(s) on the y-axis |
| | Left Arrow Key | Leftmost point on the leftmost object(s) on the x-axis |
| | Right Arrow Key | Rightmost point on the rightmost object(s) on the x-axis |

For each original object 243, 245, 247, 249 selected, the farthest point from the zero axis point 234 is determined and the farthest point from the zero axis point 234 is set as the proximal offset point (step 206), for example by the duplication program 66.

The first object selected in FIG. 7 is the label "Name" 243 and the farthest axis point of this object is the bottom of "Name" and is indicated by reference number 235. The farthest axis point is the furthest point from the object selected for duplication relative to the direction or axis chosen for duplication. The zero axis point 234 is the point on the first object 243 selected for duplication that is the starting point relative to the direction which was selected for duplication.

The second object selected for duplication in FIG. 7 is the input box 245. The farthest point from the zero axis point 234 for the second object 245 is indicated by reference number 237 and is the proximal offset point for the second object 245. The starting point 236 for the second object 245 is indicated by reference number 236.

The third object selected for duplication in FIG. 7 is the label "Address" 247. The starting point for the third object 247 is indicated by reference number 238 and the farthest point of the third object from the zero axis point 234 is indicated by reference number 239 and is the proximal offset point for the third object 247.

The fourth object selected for duplication in FIG. 7 is the input box 249. The farthest point from the zero axis point 234 for the fourth object 249 is indicated by reference number 241. The starting point for the fourth object 249 is indicated by reference number 240. Since the fourth object 249 had the furthest point from the zero axis point 234, this point is set as the proximal offset point for the fourth object 249 and the entire set of original objects 230 selected for duplication.

If there is not a distal object to be duplicated whose starting point is greater than the proximal offset point (step 208), than no distal offset point is present and no selectable arrow will be displayed for that particular object (step 210) and the method continues to step 218. Greater than the proximal offset point, refers to the starting point that is further along the axis associated with the direction of duplication than the proximal offset point. An example of when steps 208 and 210 may be carried out is if the objects to be duplicated overlapped each other. In another example, these steps would be carried out for the last object selected for duplication in the direction chosen, since no symbol would be displayed.

If there is a distal object to be duplicated whose starting point is greater than the proximal offset point (step 208), that distal object's starting point will be the distal offset point (step 212), for example by the duplication program 66. Greater than the proximal offset point, refers to the starting point that is further along the axis associated with the direction of duplication than the proximal offset point.

Referring to FIG. 7, since the starting point 236 of the second object 245 is greater than the proximal offset point 237 of the second object 245, the starting point of the second object is designated as the distal offset point 236 for the second object 245.

Similarly, since the starting point 238 of the third object 247 is greater than the proximal offset point 239 of the third object 247, the starting point of the third object is designated as the distal offset point 238 of the third object. Since the starting point 240 of the fourth object 249 is greater than the proximal offset point 247 of the fourth object 249, the starting point of the fourth object is designated as the distal offset point 240 of the fourth object.

The distance between the proximal offset points and the distal offset points of the objects for duplication 230 are determined and the distance is set as being equivalent to the offset distance (step 214), for example by the duplication program 66.

A selectable symbol, for example double arrows, is displayed between the two objects that span the offset distance and point in the direction of duplication chosen by the user (step 216).

The offset distance between the proximal offset point 235 of the first object 243 and the distal offset point of the second object 245 is shown by double arrows 242 and is approximately 9 pixels in this example. The offset distance between the proximal offset point 237 of the second object 245 and the distal offset point 238 of the third object 247 is shown by double arrows 244 and is approximately 45 pixels. The offset distance between the proximal offset point of the third object 247 and the distal offset point 240 of the fourth object 249 is should by double arrows 248 and is approximately 9 pixels in this example. It should be noted that other symbols besides the double arrow may be used to indicate the offset distance and direction of duplication chosen by the user.

If there are any objects which have not had the farthest point from the zero axis point determined, the method continues to step 206 and repeats steps 206, 208, 210, 212, 214, and 216.

If all of the objects have had the farthest point from the zero axis point determined, the duplication program 66 receives a selection of the selectable symbol from the user (step 220).

All of the selected objects are duplicated and placed immediately after the farthest axis point, plus an offset distance indicated by the selected symbol indicated by the user (step 222) and the method ends.

In FIG. 7, the user would have selected the offset distance 244 of 45 pixels between the second object 245 and the third object 247. The duplicated objects 232 are 45 pixels from the farthest axis point 241 of the original objects 230 selected for duplication.

FIGS. 8A-8E show an example of the method of FIGS. 6A-6B with eight objects selected for duplication and the direction of the duplication being to the right.

Figures 8A, 8B:
FIGS. 8A-8E show an example of the method of FIGS. 6A-6B with eight objects selected for duplication and the direction of the duplication being to the right.
Figure 8C:
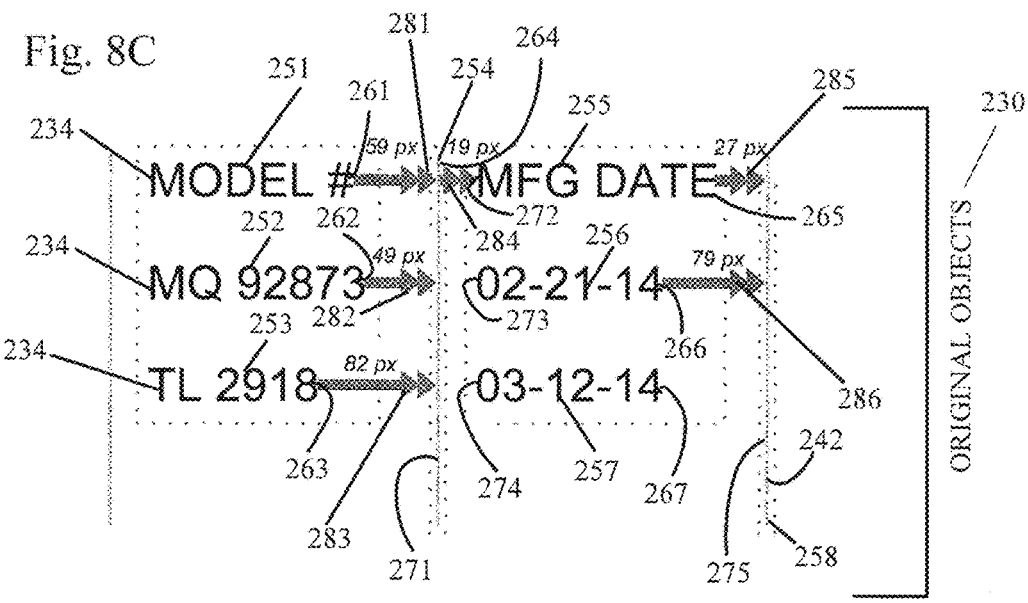

Referring to FIGS. 8A-8B, the user indicates a selection of original objects for duplication 230, shown by the dotted line and which includes "MODEL#" 251, "MQ 92873" 252, "TL 2918" 253, a vertical line 254, "MFG DATE" 255, "02-21-15" 256, "03-12-14" 257 and another vertical line 258. This selection may be done using any number of means. A mouse, stylus, or user's touch may be used to select the objects to be duplicated. An indication of the direction for the duplication is also provided by the user. The indication of the direction for the duplication is preferably indicated by the depressing of an arrow key, although other means of indicating direction may also be used. Alternatively, any additional key in addition to an arrow key may be used to select and indicate the items for and the direction of duplication, for example the shift key.

A zero axis point 234 and the farthest axis point based on the direction received of the entire span of selected objects 230 for duplication is determined. In this case, the zero axis point is the leftmost point of the objects "MODEL#" 251, "MQ 92873" 252 and "TL 2918" 253. Since these objects 251, 252, 253 are aligned in a column; the zero axis point 234 is defined by more than one object. Only one zero axis point for any group of selected objects is present, thus the objects that start from the same point all define the zero axis point.

For each object selected, the farthest axis point from the zero axis point is determined and set as the proximal offset point. For object 251, represented as "MODEL #", the proximal offset point 261 is the rightmost point of the # symbol. For object 252, represented as "MQ 92873", the proximal offset point 262 is the rightmost point of the "3". For object 253, represented as "TL 2918", the proximal offset point is the rightmost point of the "8". For object 254, represented as a line, the rightmost point of the line is the proximal offset point 264. For object 255, represented as "MFG DATE", the proximal offset point 265 is the rightmost point of the "E". For object 256, represented as "02-21-14", the proximal offset point 266 is the rightmost point on the "4". For object 257, represented as "03-12-14", the proximal offset point 267 is the rightmost point of the "4". For object 258, represented as a line, the rightmost point of the line is the proximal offset point 242 and in this case the farthest axis point of all of the original objects selected for duplication.

Since an object with a starting point that is greater than the proximal offset point is present, the distal object's starting point is designated as the distal offset point. For object 254, represented as a line, the distal offset point 271 is the leftmost point of the line. For object 255, represented as "MFG DATE", the distal offset point 272 is the leftmost point of the "M". For object 256, represented as "02-21-14", the distal offset point 273 is the leftmost point on the "0". For object 257, represented as "03-12-14", the distal offset point 274 is the leftmost point of the "0". For object 258, represented as a line, the leftmost point of the line is the distal offset point 274. Objects 251, 252 and 253 do not have distal offset points.

The distance between the proximal offset points and the distal offset points is determined and the distance is set as the offset distance. Selectable symbols are displaced between the two objects that spans the offset distance and points in the direction of duplication chosen by the user, which in this case is to the right.

The first offset distance 281 is present between the proximal offset point 261 of object 251 and the distal offset point 271 of object 254 and in this example is equivalent to 59 pixels. The second offset distance 282 is present between the proximal offset point 262 of object 252 and the distal offset point 271 of object 254 and in this example is equivalent to 49 pixels. The third offset distance 283 is present between the proximal offset point 263 of object 253 and the distal offset point 271 of object 254 and in this example is equivalent to 82 pixels. The fourth offset distance 284 is present between the proximal offset point 264 of object 254 and the distal offset point 272 of object 255 and in this example is equivalent to 19 pixels. The fifth offset distance 285 is present between the proximal offset point 265 of object 255 and the distal offset point 275 of object 258 and in this example is equivalent to 27 pixels. The sixth offset distance 286 is present between the proximal offset point 266 and the distal offset point 275 of object 258 and in this example is equivalent to 79 pixels.

The offset distances that would be the same, for example between the line 254 and objects 256 and 257 as the offset distance 284, may be not shown to cut down on the visual "noise" displayed to the user.

Figure 8D:
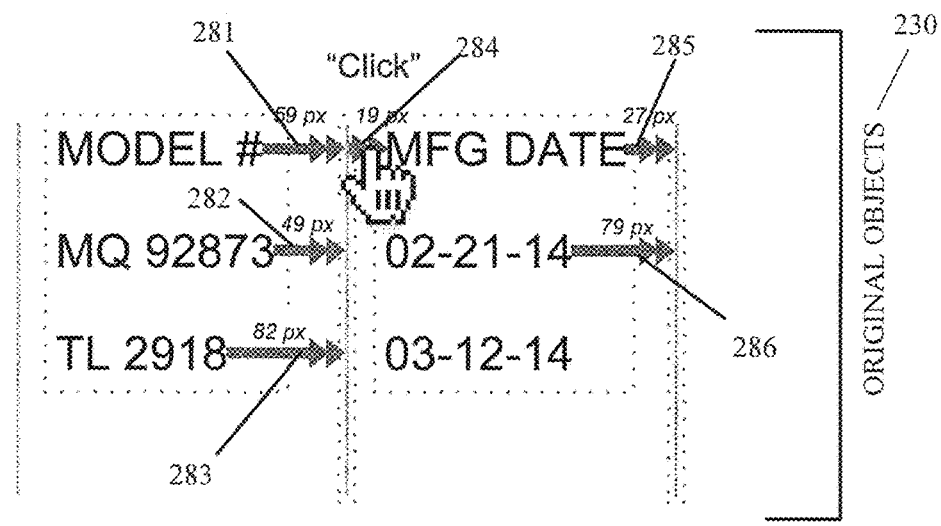

Since there are no objects which have not had the farthest point from the zero axis determined, the duplication program 66 waits to receive a selection of a selectable symbol from a user. Referring to FIG. 8D, the user selected the offset distance 284 of 19 pixels.

Figure 8E:
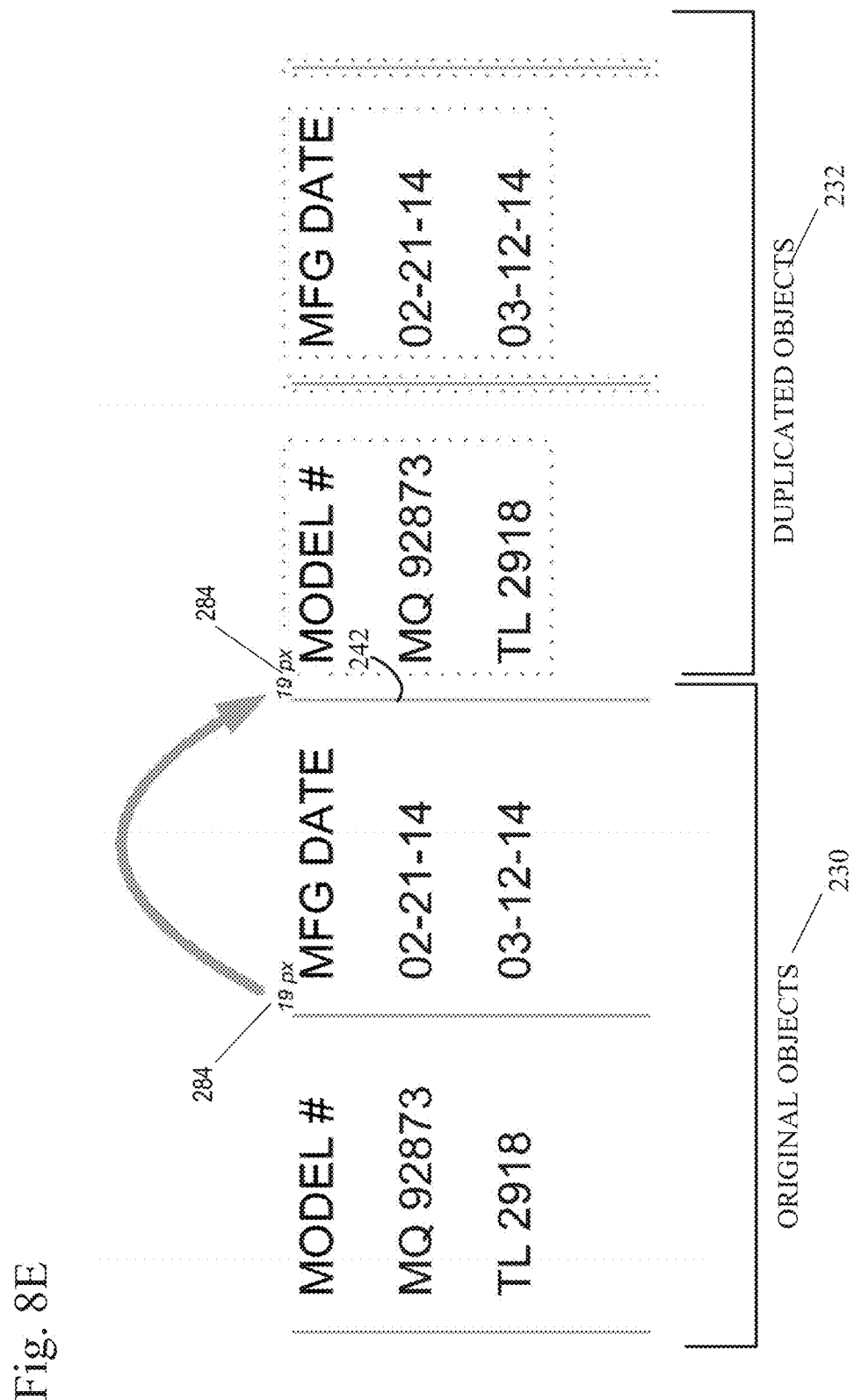

The duplication program 66 duplicates all of the selected, original objects 230 and places the duplicated objects 232 immediately after the farthest axis point, an offset distance as selected by the user. Referring to FIG. 8E, the duplicated objects 232 are placed 19 pixels from the farthest axis point 242 of the original objects 230.

Figure 9:
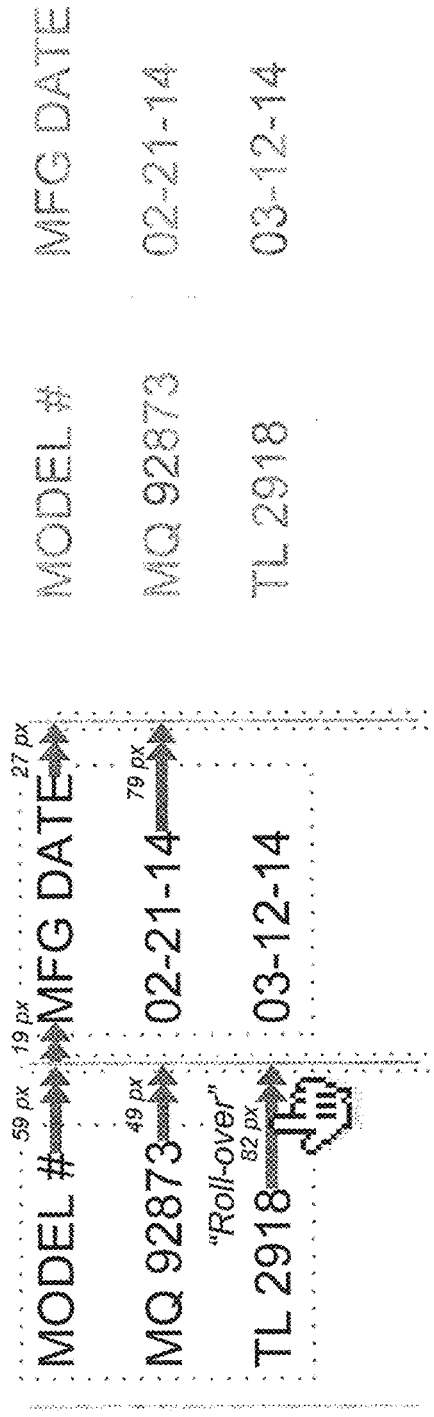
FIG. 9 shows a first example of a preview of the duplication of objects based on the method of FIGS. 6A-6B.
Figure 10:
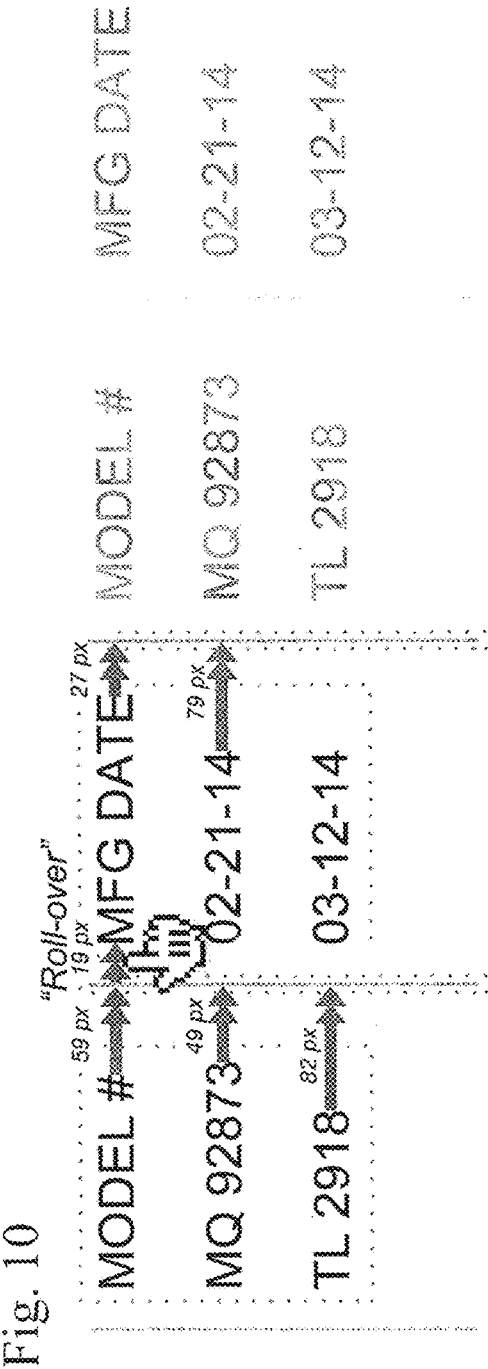
FIG. 10 shows another example of a preview of the duplication of objects based on the method of FIGS. 6A-6B.

FIGS. 9-10 show a preview function, in which the user can place a selection tool over an offset distance and the duplication program 66 will generate a preview of how the duplicated objects would look if the user were to "click" or select a specific offset distance. In FIG. 9, the preview is showing a preview of the offset distance of 82 pixels and in FIG. 10, the preview is showing an offset distance of 19 pixels.

FIG. 11 illustrates internal and external components of device computer 52 and server computer 54 in which illustrative embodiments may be implemented. In FIG. 11, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and duplication program 66 are stored on one or more of the computer-readable tangible storage devices 830 for execution by one or more of the processors 820 via one or more of the RAMs 822 (which typically include cache memory). In the embodiment illustrated in FIG. 11, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Duplication program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Duplication program 66 can be downloaded to the device computer 52 and server computer 54 from an external computer via a network (for example, the Internet, a local area network or other, wide area network) and network adapter or interface 836. From the network adapter or interface 836, duplication program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Duplication program 66 can be written in various programming languages including low-level, high-level, object-oriented or non object-oriented languages. Alternatively, the functions of a duplication program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of graphically duplicating graphic objects, comprising the steps of:
   a computer receiving a selection of at least two objects and a direction of duplication along an axis, each of the at least two objects having a starting point and a farthest point relative to the direction of the duplication along the axis;
   the computer determining a zero axis point and a farthest axis point based on the direction of duplication of the at least two objects;
   the computer determining a proximal object from the at least two objects and setting a proximal offset point equivalent to a farthest point on the proximal object from the zero axis point;
   the computer determining a distal object from the at least two objects based on the direction of duplication along the axis, and that the distal object has a starting point that is further along the axis associated with the direction of duplication than the proximal offset point;
   the computer designating a starting point of the distal object as a distal offset point;
   the computer determining an offset distance equal to a distance between the distal offset point and the proximal offset point; and
   the computer duplicating the selection of the at least two objects and placing duplicates of the selection of the at least two objects immediately after the farthest axis point, plus the offset distance from the farthest axis point.

2. The method of claim 1, wherein the step of the computer determining a proximal object from the at least two objects and setting a proximal offset point equivalent to a farthest point on the proximal object from the zero axis point comprises the steps of:
   the computer determining that more than one object has a starting point that equals the zero axis point; and
   the computer setting an object from the selection of at least two objects which takes up the most distance on the axis as the proximal object.

3. The method of claim 1, wherein the step of the computer determining a proximal object from the at least two objects and setting a proximal offset point equivalent to a farthest point on the proximal object from the zero axis point comprises the steps of:
   the computer determining that more than one object does not have a starting point that equals the zero axis point; and
   the computer setting an object with the starting point equal to the zero axis point as the proximal object.

4. The method of claim 1, wherein prior to the computer duplicating the selection of the at least two objects, the method comprising the steps of:
   the computer displaying at least one selectable symbol, the selectable symbols being between the objects that span the offset distance, the selectable symbol indicating the direction of duplication received; and
   the computer receiving a selection of a selectable symbol through a selection tool.

5. The method of claim 4, wherein a preview of placement of the duplicates of the selection of the at least two objects is displayed when a user places a selection tool over the selectable symbol but does not select the selectable symbol.

6. A computer program product for graphically duplicating graphic objects, a computer comprising at least one processor, one or more memories, one or more computer readable storage media, the computer program product comprising a computer readable storage medium having program instructions embodied therewith, the program instructions executable by the computer to perform a method comprising:
   receiving, by the computer, a selection of at least two objects and a direction of duplication along an axis, each of the at least two objects having a starting point and a farthest point relative to the direction of the duplication along the axis;
   determining, by the computer, a zero axis point and a farthest axis point based on the direction of duplication of the at least two objects;
   determining, by the computer, a proximal object from the at least two objects and setting a proximal offset point equivalent to a farthest point on the proximal object from the zero axis point;
   determining, by the computer, a distal object from the at least two objects based on the direction of duplication along the axis, and that the distal object has a starting point that is further along the axis associated with the direction of duplication than the proximal offset point;
   designating, by the computer, a starting point of the distal object as a distal offset point;
   determining, by the computer an offset distance equal to a distance between the distal offset point and the proximal offset point; and
   duplicating, by the computer, the selection of the at least two objects and placing duplicates of the selection of the at least two objects immediately after the farthest axis point, plus the offset distance from the farthest axis point.

7. The computer program product of claim 6, wherein the step of determining, by the computer, a proximal object from the at least two objects and setting a proximal offset point equivalent to a farthest point on the proximal object from the zero axis point comprises the steps of:
   determining, by the computer, that more than one object has a starting point that equals the zero axis point; and
   setting, by the computer, an object from the selection of at least two objects which takes up the most distance on the axis as the proximal object.

8. The computer program product of claim 6, wherein the step of determining, by the computer, a proximal object from the at least two objects and setting a proximal offset point equivalent to a farthest point on the proximal object from the zero axis point comprises the steps of:
   determining, by the computer, that more than one object does not have a starting point that equals the zero axis point; and
   setting, by the computer, an object with the starting point equal to the zero axis point as the proximal object.

9. The computer program product of claim 6, wherein prior to the computer duplicating the selection of the at least two objects, the method comprising the steps of:
   displaying, by the computer, at least one selectable symbol, the selectable symbols being between the objects that span the offset distance, the selectable symbol indicating the direction of duplication received; and
   receiving, by the computer, a selection of a selectable symbol through a selection tool.

10. The computer program product of claim 9, wherein a preview of placement of the duplicates of the selection of the at least two objects is displayed when a user places a selection tool over the selectable symbol but does not select the selectable symbol.

11. A computer system for graphically duplicating graphic objects comprising a computer comprising at least one processor, one or more memories, one or more computer readable storage media having program instructions executable by the computer to perform the program instructions comprising:
   receiving, by the computer, a selection of at least two objects and a direction of duplication along an axis, each of the at least two objects having a starting point and a farthest point relative to the direction of the duplication along the axis;
   determining, by the computer, a zero axis point and a farthest axis point based on the direction of duplication of the at least two objects;
   determining, by the computer, a proximal object from the at least two objects and setting a proximal offset point equivalent to a farthest point on the proximal object from the zero axis point;
   determining, by the computer, a distal object from the at least two objects based on the direction of duplication along the axis, and that the distal object has a starting point that is further along the axis associated with the direction of duplication than the proximal offset point;
   designating, by the computer, a starting point of the distal object as a distal offset point;
   determining, by the computer an offset distance equal to a distance between the distal offset point and the proximal offset point; and
   duplicating, by the computer, the selection of the at least two objects and placing duplicates of the selection of the at least two objects immediately after the farthest axis point, plus the offset distance from the farthest axis point.

12. The computer system of claim 11, wherein the step of determining, by the computer, a proximal object from the at least two objects and setting a proximal offset point equivalent to a farthest point on the proximal object from the zero axis point comprises the steps of:
   determining, by the computer, that more than one object has a starting point that equals the zero axis point; and
   setting, by the computer, an object from the selection of at least two objects which takes up the most distance on the axis as the proximal object.

13. The computer system of claim 11, wherein the step of determining, by the computer, a proximal object from the at least two objects and setting a proximal offset point equivalent to a farthest point on the proximal object from the zero axis point comprises the steps of:
   determining, by the computer, that more than one object does not have a starting point that equals the zero axis point; and setting, by the computer, an object with the starting point equal to the zero axis point as the proximal object.

14. The computer system of claim 11, wherein prior to the computer duplicating the selection of the at least two objects, the method comprising the steps of:
- displaying, by the computer, at least one selectable symbol, the selectable symbols being between the objects that span the offset distance, the selectable symbol indicating the direction of duplication received; and
- receiving, by the computer, a selection of a selectable symbol through a selection tool.

15. The computer system of claim 14, wherein a preview of placement of the duplicates of the selection of the at least two objects is displayed when a user places a selection tool over the selectable symbol but does not select the selectable symbol.

* * * * *